(12) United States Patent
Chen

(10) Patent No.: US 9,678,530 B2
(45) Date of Patent: Jun. 13, 2017

(54) CLOCK SKEW ADJUSTING STRUCTURE

(71) Applicant: UNITED MICROELECTRONICS CORPORATION, Hsinchu (TW)

(72) Inventor: Chien-Hung Chen, Taipei (TW)

(73) Assignee: UNITED MICROELECTRONICS CORPORATION, Hsinchu (TW)

( * ) Notice: Subject to any disclaimer, the term of this patent is extended or adjusted under 35 U.S.C. 154(b) by 50 days.

(21) Appl. No.: 14/819,444

(22) Filed: Aug. 6, 2015

(65) Prior Publication Data
US 2015/0355672 A1    Dec. 10, 2015

Related U.S. Application Data

(63) Continuation of application No. 14/035,952, filed on Sep. 25, 2013, now Pat. No. 9,135,389.

(51) Int. Cl.
*G06F 17/50* (2006.01)
*H03K 19/177* (2006.01)
(Continued)

(52) U.S. Cl.
CPC ............ *G06F 1/10* (2013.01); *G06F 17/5068* (2013.01); *G06F 17/5072* (2013.01); *G06F 17/5077* (2013.01); *H01L 23/522* (2013.01); *H03K 19/1774* (2013.01); *G06F 17/50* (2013.01); *G06F 17/5045* (2013.01); *G06F 2217/62* (2013.01); *G06F 2217/84* (2013.01); *H01L 23/5226* (2013.01); *H01L 2924/0002* (2013.01); *H03K 19/17736* (2013.01)

(58) Field of Classification Search
CPC .. G06F 17/50; G06F 17/5045; G06F 17/5068; G06F 17/5072; G06F 17/5077; G06F 2217/84; H03K 19/17736; H03K 19/1774

USPC ............... 716/110, 114, 118–119, 122, 126, 716/129–130, 132, 134
See application file for complete search history.

(56) References Cited

U.S. PATENT DOCUMENTS 6,020,774 A    2/2000   Chiu
6,412,099 B1   6/2002   Chiba
(Continued)

FOREIGN PATENT DOCUMENTS

CN    1612323 A       5/2005
CN    102887476 A     1/2013
TW    595104 B        6/2004

OTHER PUBLICATIONS

Chen, Xi, et al., "Adaptive clock distribution for #D integrated Circuits", 2011, IEEE, pp. 91-94.*

*Primary Examiner* — Stacy Whitmore
(74) *Attorney, Agent, or Firm* — Ding Yu Tan

(57) ABSTRACT

An clock skew adjusting structure is provided. The clock skew adjusting structure includes a substrate, a wiring structure, a first active component and a second active component. The wiring structure includes at least a wiring layer and at least a via, the via is configured for different wiring layers to be electrically connected with each other. The first active component is formed on the substrate and configured for delivering a clock signal to the wiring structure. The second active component is formed on the substrate and electrically connected to the first active component through the wiring structure thus forming a timing path. The second active component receives the clock signal through the timing path.

4 Claims, 9 Drawing Sheets

(51) Int. Cl.
*G06F 1/10* (2006.01)
*H01L 23/522* (2006.01)

(56) References Cited

U.S. PATENT DOCUMENTS

| | | | |
|---|---|---|---|
| 6,519,750 B2 | 2/2003 | Yamashita | |
| 6,530,030 B1 | 3/2003 | Okabe | |
| 6,550,044 B1 | 4/2003 | Pavisic | |
| 6,751,786 B2 | 6/2004 | Teng | |
| 6,782,519 B2 | 8/2004 | Chang | |
| 6,907,585 B2 | 6/2005 | Kohno | |
| 6,910,202 B2 | 6/2005 | Minami | |
| 6,941,533 B2 | 9/2005 | Andreev | |
| 6,981,233 B2 | 12/2005 | Chang | |
| 7,007,263 B2 | 2/2006 | Yang | |
| 7,039,891 B2 | 5/2006 | Tetelbaum | |
| 7,051,310 B2 | 5/2006 | Tsao | |
| 7,103,862 B2 | 9/2006 | Sung | |
| 7,191,418 B2 | 3/2007 | Lee | |
| 7,216,322 B2 | 5/2007 | Lai | |
| 7,231,620 B2 | 6/2007 | Jang | |
| 7,257,782 B2 | 8/2007 | Ho | |
| 7,331,024 B2 | 2/2008 | Sato | |
| 7,383,523 B2 | 6/2008 | Inoue | |
| 7,467,367 B1 | 12/2008 | Li | |
| 7,490,307 B2 | 2/2009 | Fornaciari | |
| 7,543,258 B2 | 6/2009 | Kitahara | |
| 7,904,874 B2 | 3/2011 | Nieh | |
| 7,937,677 B2 | 5/2011 | Chien | |
| 7,996,796 B2 | 8/2011 | Nonaka | |
| 8,271,920 B2 | 9/2012 | Cho | |
| 8,375,347 B2 | 2/2013 | Liu | |
| 8,384,436 B2 | 2/2013 | Peng | |
| 2002/0199158 A1* | 12/2002 | Sano | G06F 17/5077 716/114 |
| 2005/0068080 A1* | 3/2005 | Lee | H03K 3/037 327/199 |
| 2008/0157385 A1* | 7/2008 | Yue | H01L 23/66 257/773 |
| 2010/0235802 A1 | 9/2010 | Singasani | |
| 2010/0262939 A1 | 10/2010 | Zahn | |
| 2010/0299645 A1 | 11/2010 | Sakurai | |
| 2010/0308882 A1* | 12/2010 | Liu | H03K 5/131 327/283 |
| 2012/0023470 A1 | 1/2012 | Nakagawa | |
| 2012/0167030 A1 | 6/2012 | Gonzalez | |
| 2013/0063193 A1* | 3/2013 | Zhang | H04L 7/0337 327/157 |

* cited by examiner

CLOCK SKEW ADJUSTING STRUCTURE

CROSS-REFERENCE TO RELATED APPLICATION

This application is a continuation application of an U.S. patent application Ser. No. 14/035,952, filed on Sep. 25, 2013. The entirety of the above-mentioned patent application is hereby incorporated by reference herein and made a part of this specification.

FIELD OF THE INVENTION

The present invention relates to a clock transmission adjusting method and structure, and particular relates to a clock skew adjusting method and structure for integrated circuit design.

BACKGROUND OF THE INVENTION

Please refer to FIG. 1, a process flow diagram illustrating a conventional integrated circuit (IC) design and manufacture flow. The major steps involved in the conventional integrated circuit design includes: definition of system specification (step 11), architectural design (step 12), functional design and logic design (step 13), circuit design (step 14), and physical design (step 15). Data from the physical design stage should go through a series of physical verification steps and signoff checks (step 16) before they are taped-out. Then, wafer fabrication (step 17) according to the physical design for the integrated circuit is performed. Following the fabrication stage, the fabricated ICs are packaged and tested (step 18), and demand IC chip products are obtained at last.

As shown in FIG. 2, the physical design stage/step (step 15) of the conventional IC design of FIG. 1 mainly includes sub-steps of: partitioning (step 151), floorplanning (step 152), placement (step 153), clock tree synthesis (CTS) (step 154), signal routing (step 155), and timing closure (step 156). The clock tree synthesis (step 154) is performed for minimizing or limiting clock skew between timing paths in one chip within an acceptable range. However, with the development of the integrated circuit technology, the clock operation frequency is rapidly increasing, the conventional synchronization mechanism needs more and more active delay cells for achieving further more precise timing control. Therefore, there is a need of improving the synchronization within the chip in a much effective or controllable manner.

SUMMARY OF THE INVENTION

In accordance with an aspect of the present invention, an adjusting method of clock transmission which can be applied to integrated circuit design is provided. The adjusting method includes steps as follows. At first, a timing path including at least a clock source and a sequential logic cell is provided. Then, at least one non-active wire delay module is inserted in the timing path to approach a predetermined clock arrival time.

In accordance with a further aspect of the present invention, an integrated circuit structure is provided. The integrated circuit structure includes a semiconductor substrate, a signal wire, and a clock transmission adjusting structure. There is a clock source and a sequential logic cell disposed on the semiconductor substrate. The signal wire is electrically connected between the clock source and the sequential logic cell to form a timing path. The clock transmission adjusting structure is disposed on a surface of the semiconductor substrate and includes a non-active wire delay module electrically connected between the clock source and the sequential logic cell of the timing path.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
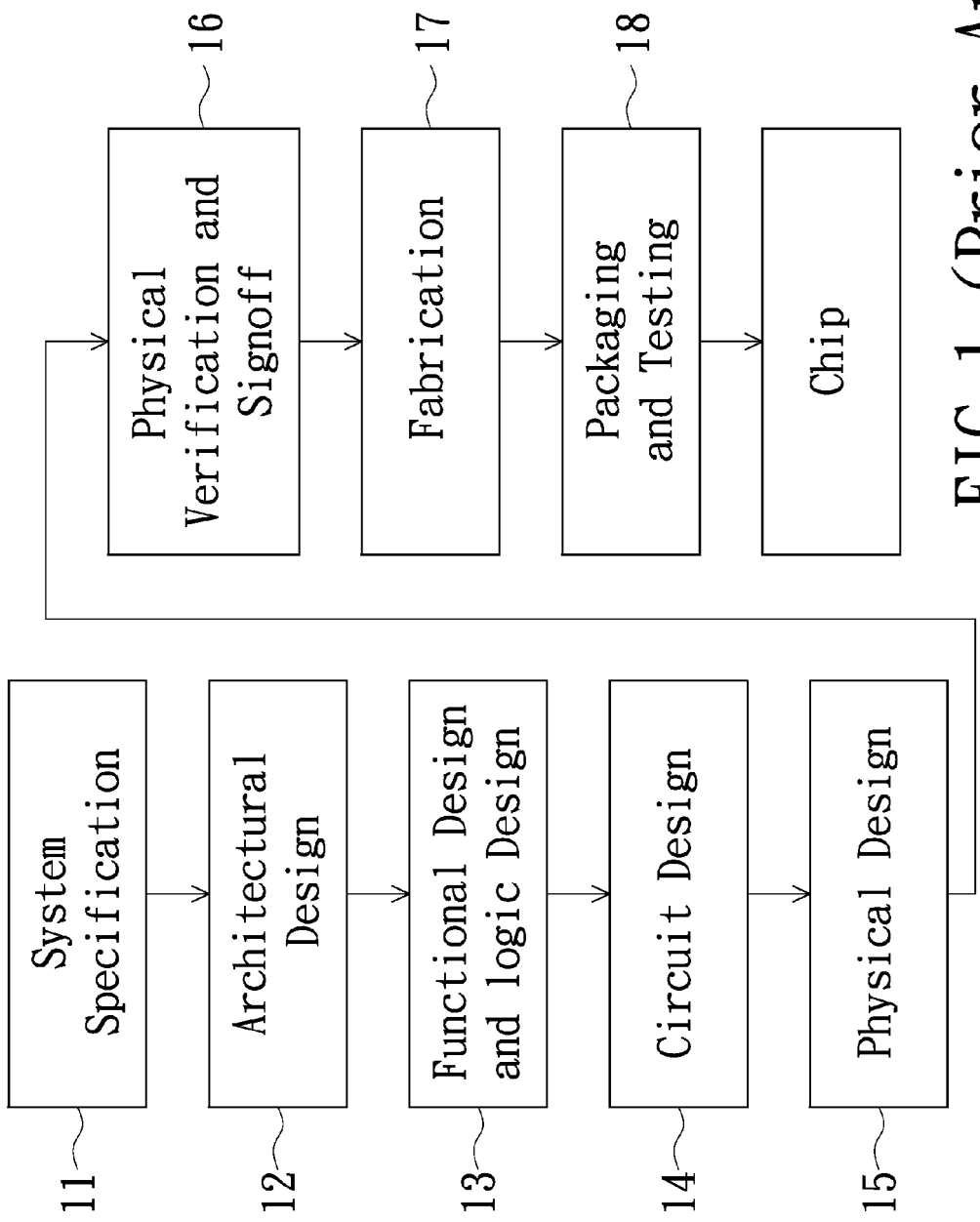
FIG. 1 is a process flow diagram illustrating a conventional integrated circuit design flow.
Figure 2:
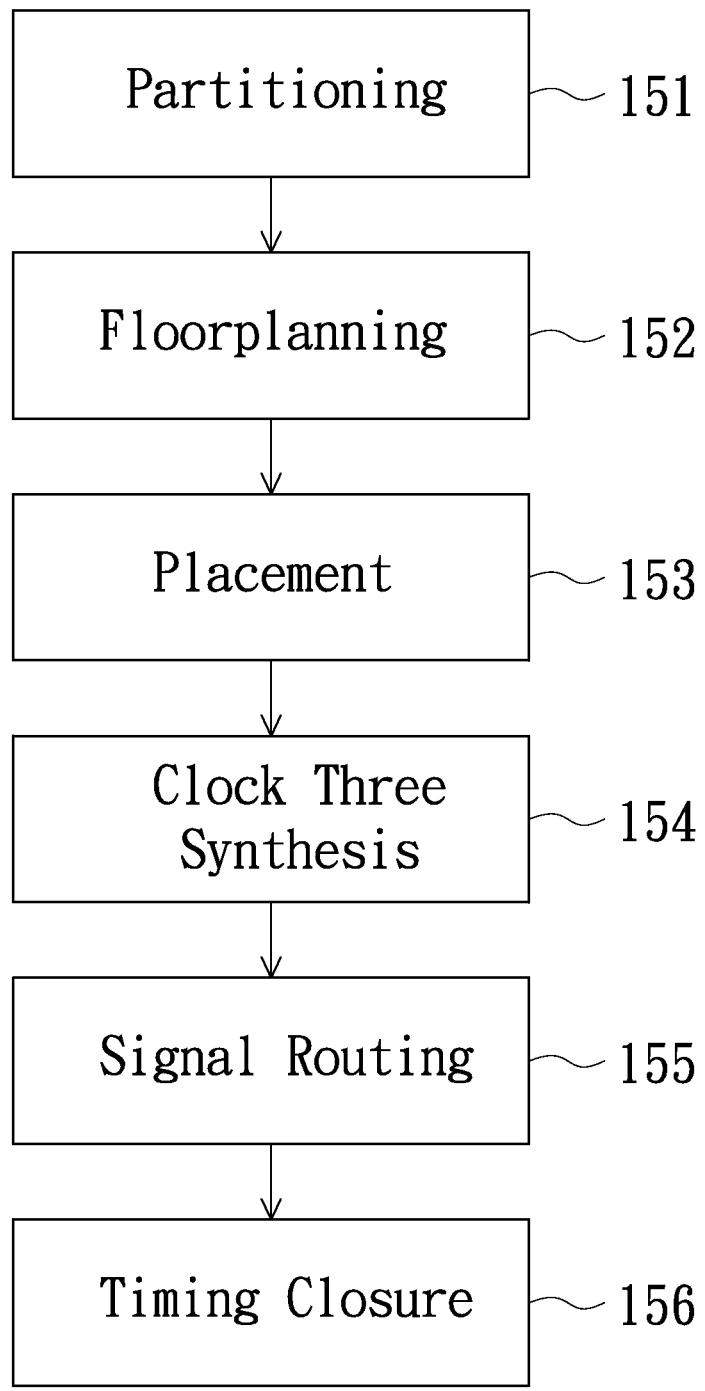
FIG. 2 is a process flow diagram illustrating a plurality of sub-steps of the physical design stage in FIG. 1.
Figure 3:
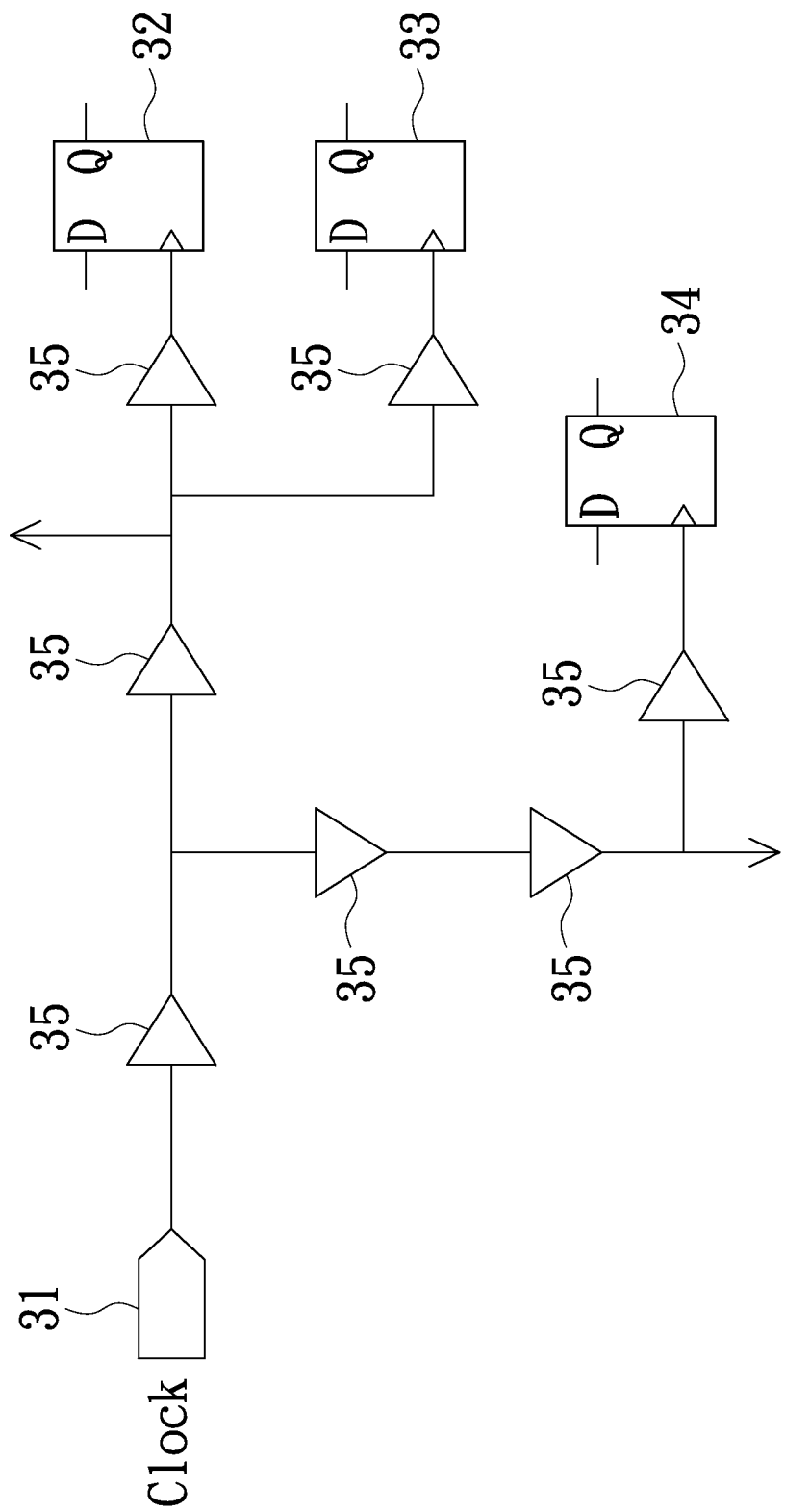
FIG. 3 is a schematic diagram illustrating the basic concept of a clock tree synthesis method and an integrated circuit structure according to the present invention.

Please refer to FIG. 3, which is a schematic diagram illustrating the basic concept of a clock tree synthesis method and an integrated circuit structure. The clock arrival times of a clock pulse, from a clock source 31, at a plurality of flip-flops 32, 33, 34 are not the same due to having different clock timing paths. Each flip-flop 32, 33, 34 is a sequential logic cell. For restricting the clock skew to meet clock skew constraint to assure regular operation of the flip-flops 32, 33, 34, different numbers of a plurality of active delay cells 35, e.g. clock buffers, are inserted to the corresponding clock timing paths. The active delay cells 35 are usually implemented by active components, e.g. metal-oxide-semiconductor (MOS) elements such as invertors to cause latency of multiple of unit time.

Figure 4:
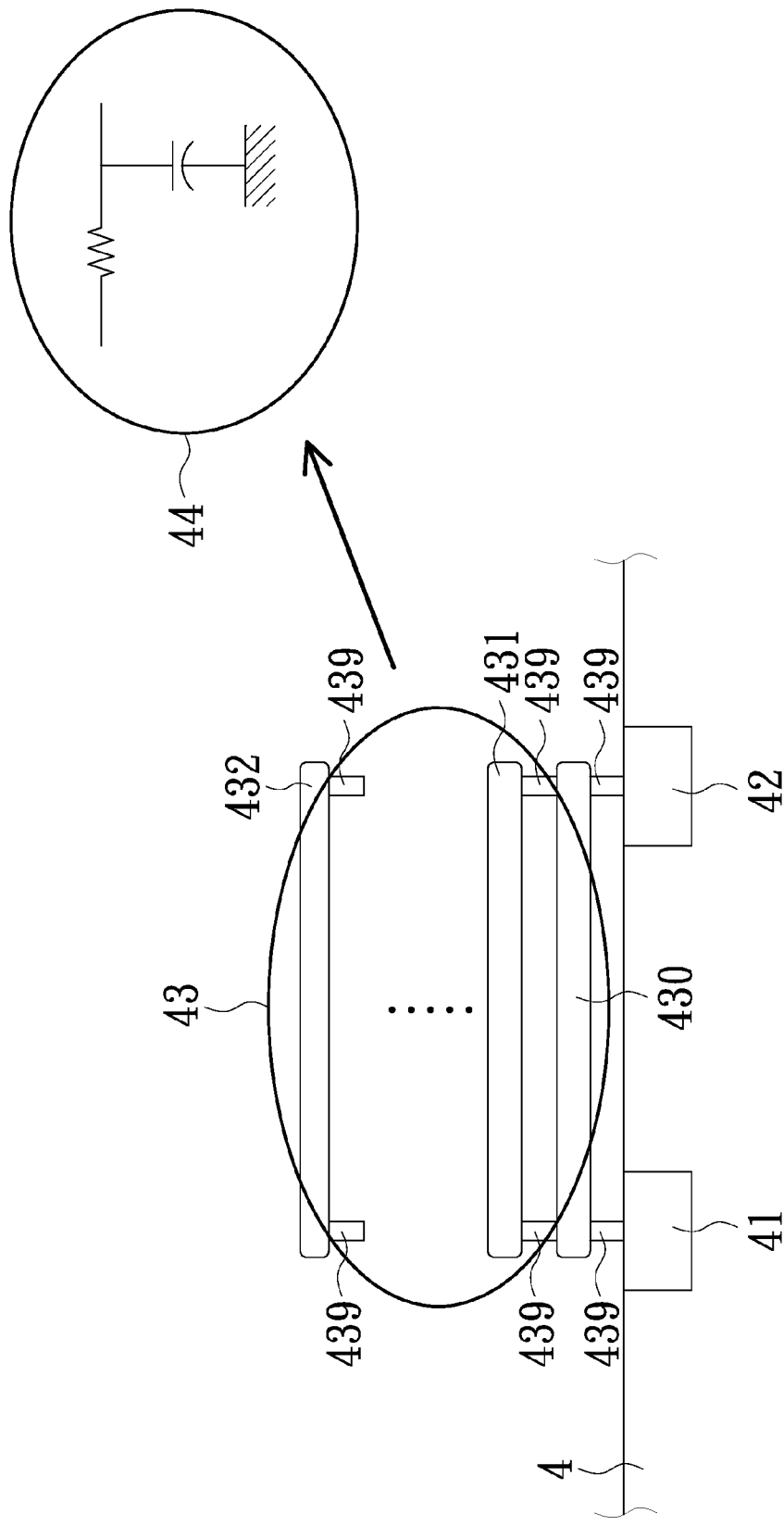
FIG. 4 is a schematic diagram illustrating a clock skew adjusting structure according to a first embodiment of the present invention.

With the development of the integrated circuit technology, clock frequency is rapidly increasing. The synchronization mechanism needs more and more active delay cells for further more precise timing control. To overcome this problem, a clock skew adjusting method and a clock skew adjusting structure are further provided according to the present invention. Referring to FIG. 4, a first active component 41 and a second active component 42 are formed on a silicon substrate 4 (or other known semiconductor substrate). The first active component 41 and the second active component 42 are electrically connected to each other through a multi-layer wiring structure 43 formed above a surface of the silicon substrate 4. The first active component 41 and the second active component 42 may be implemented by one or more of the clock source 31, flip-flops 32, 33 and 34, and the active delay cells 35 shown in FIG. 3. For example, the multi-layer wiring structure 43 including a plurality of metal wires 430, 431, 432 and a plurality of vias 439 may be disposed onto or formed as parts of the signal wires between the clock source 31, the flip-flops 32, 33 and 34, and/or the active delay cells 35. In FIG. 4, although the multi-layer wiring structure 43 is directly connected to the first active component 41 and the second active component 42, but the present invention does not limit thereto. It should be noted that at least one multi-layer wiring structure 43 may be just inserted into the timing path rather than be directly connected to the active components 41 and 42. An equivalent resistor-capacitor (RC) circuit 44 of the multi-layer wiring structure 43 is viewed as a non-active wire delay module. The non-active wire delay module introduces less time delay than the active delay cells 35, so that the specific non-active wire delay module can fine-tune the clock skew in the clock tree syntheses step.

Figure 5A:
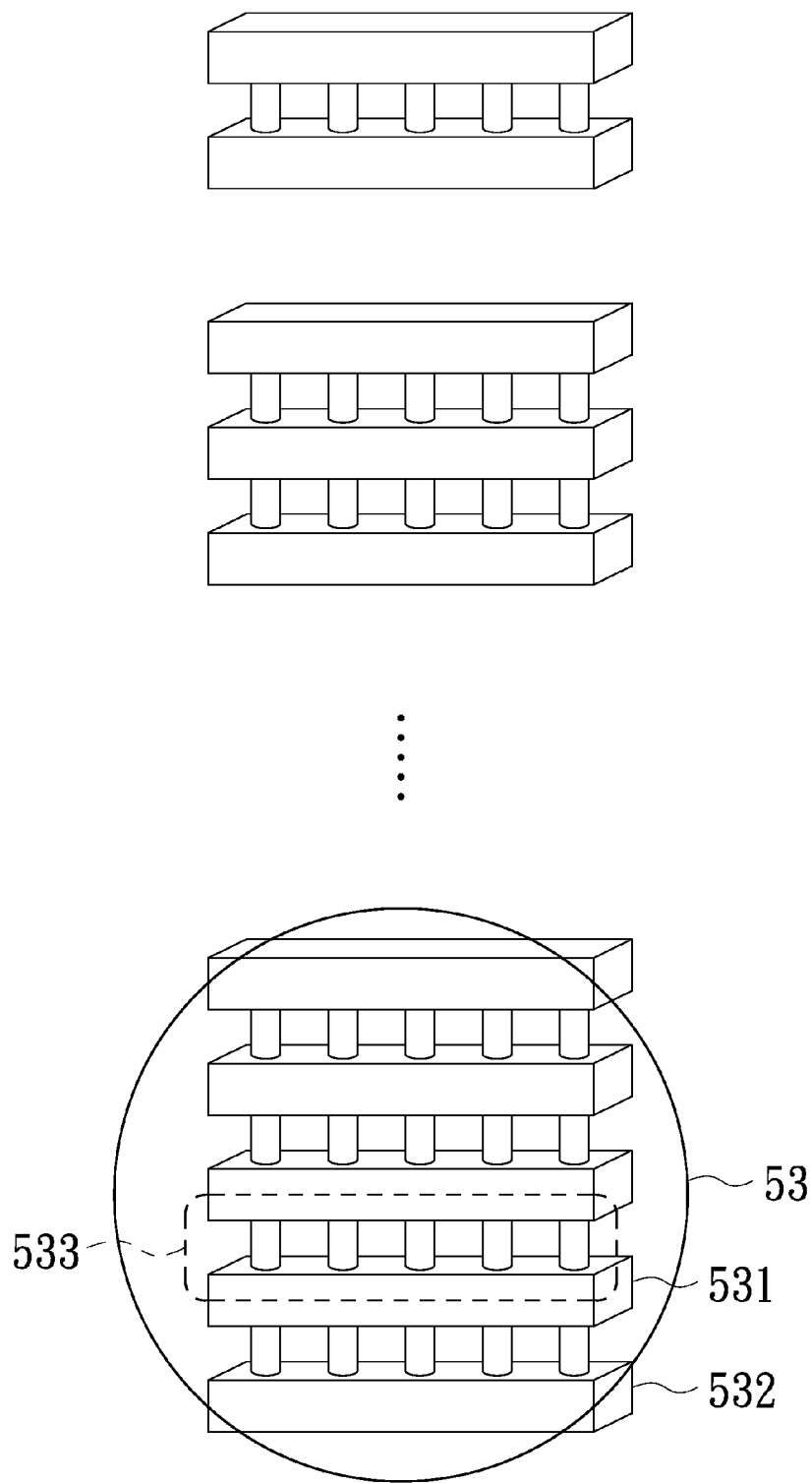
FIGS. 5A-5C are schematic diagrams illustrating clock skew adjusting structures according to several embodiments of the present invention.
Figure 5B:
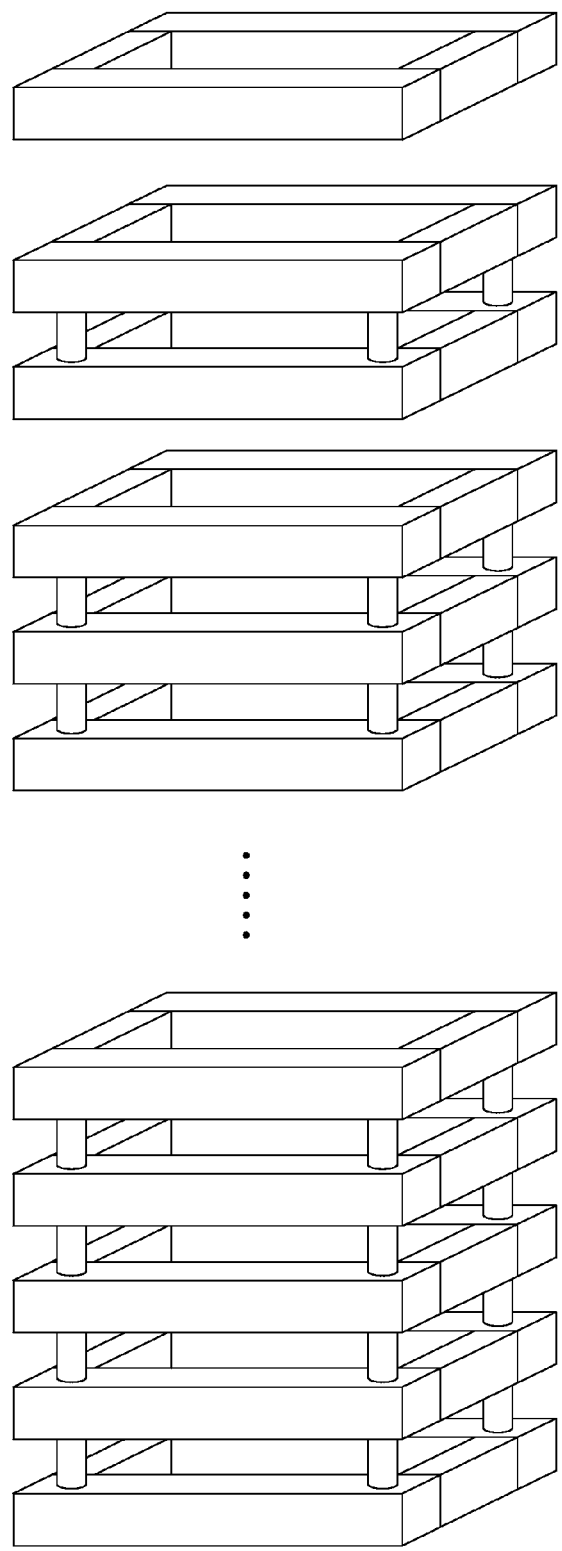
Figure 5C:
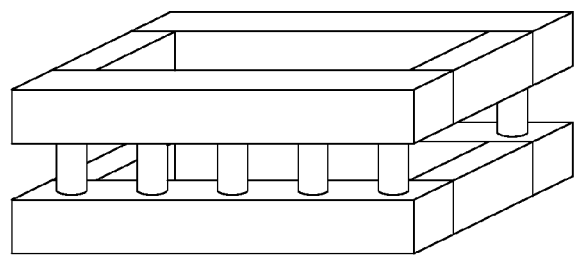
Figure 5C:
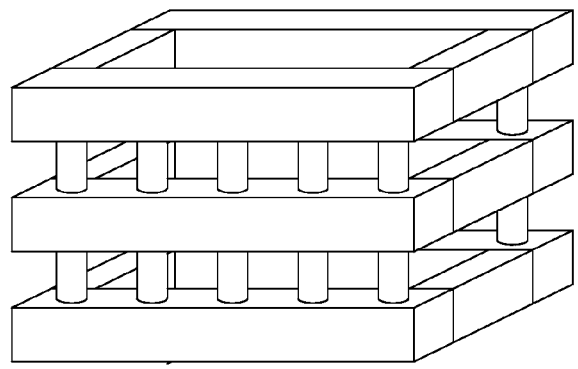
Figure 5C:
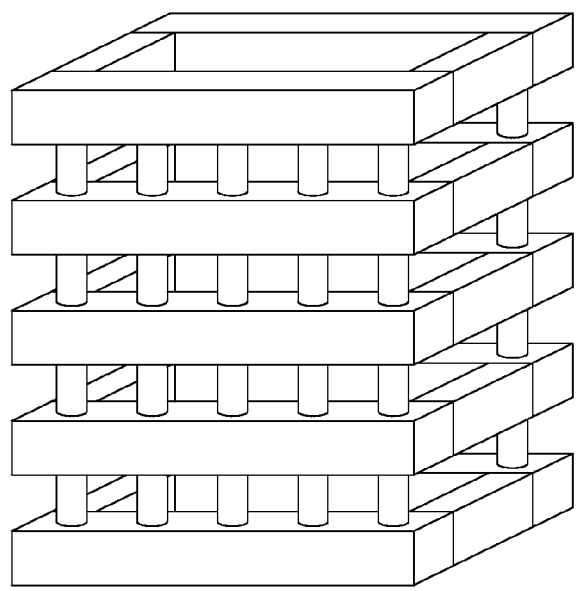

The wiring and configuration of the multi-layer wiring structure 43 is flexible and varied. Please refer to FIGS. 5A-5C, schematic diagrams illustrating clock skew adjusting structures according to several embodiments of the present invention. For example, the multi-layer wiring structure 43 can be modified to have a via array as shown in FIG. 5A. A via array 533 of a multi-layer wiring structure 53 is disposed and electrically connected between different wires 531 and 532 on different wiring layers. Any two wires allocated on different layers, e.g. wires 531 and 532, are substantially parallel to each other. The number of the via array 533 may be adjusted according to the required time delay. FIG. 5A shows the applications of one via array, two via arrays, and a plurality of via arrays disposed between different numbers of wires, but the present invention is not intended to limit thereto. Furthermore, the non-active wire delay module can be modified to have a three-dimensional structure as those shown in FIG. 5B and FIG. 5C. Accordingly, the number of layers of the wiring structure is more flexible if larger layout space is available. By adjusting the wire length, numbers of wire layers, vias or via arrays, or by adjusting the 3D structure or the capacitance of the capacitor consisting of adjacent wires and an insulating layer sandwiched therebetween, the various non-active wire delay modules can be configured to provide many time delays to establish a full and complete standard wire delay module library. In addition, the non-active wire delay module with the same time delay but having different wiring layouts can also be utilized. Definition of these wire delay modules may be collected in the standard wire delay module library for clock tree synthesis for the integrated circuit designer's selection to fine tune the clock skew in a more convenient and time-saving manner.

The non-active wire delay module is still applicable even though different wiring layers have different linewidths. To adjust the path length of the wires or the number of the vias in the via array, the present invention can control the delay time of the non-active wire delay module. Thus, it is not necessary to add active components as buffers on the silicon substrate, which crowds the limited space. Besides, the fine-tuning requirement is effectively met for the clock tree synthesis according to the present invention.

Figure 6:
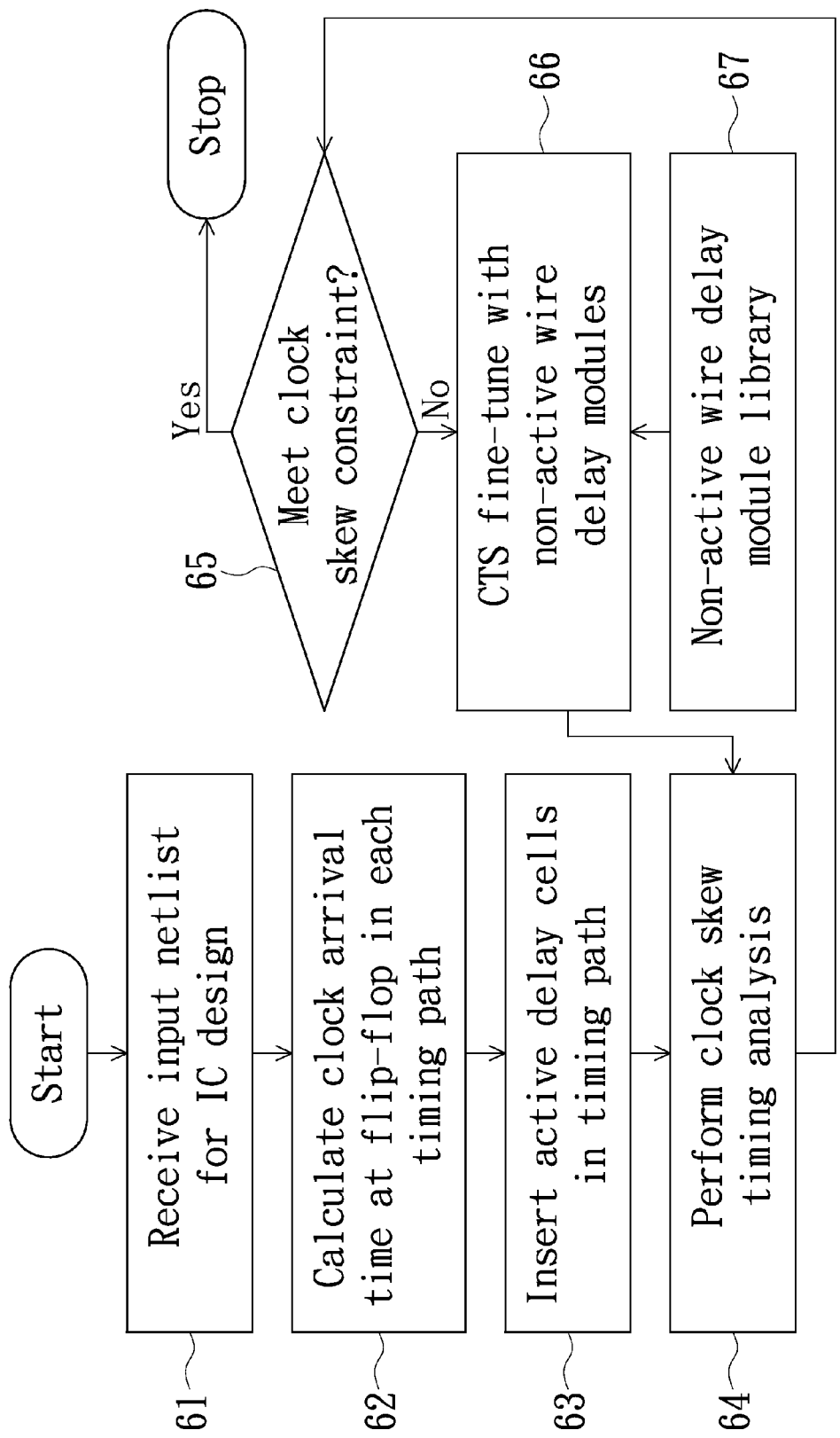
FIG. 6 is a flow chart illustrating a clock skew adjusting method for clock tree synthesis according to a third embodiment of the present invention.

Please refer to FIG. 6, a flow chart illustrating a clock skew adjusting method for clock tree synthesis according to an embodiment of the present invention. At first, an input netlist for a specific IC design is received (step 61). Then, according to the input netlist, different clock arrival times for multiple flip-flops due to different timing paths or clock path lengths are calculated (step 62). To reduce the difference in clock arrival time at the flip-flops, the active delay cells 35 such as clock buffers, are inserted in corresponding timing paths (step 63). The ideal situation is that the clock arrival time of each timing path approximates a predetermined clock arrival time. The predetermined clock arrival time is decided according to the clock arrival times calculated in the step 63. For example, the predetermined clock arrival time may be the longest one of the calculated clock arrival times or the longest one added with a predefined time value. Then, RC extraction and clock skew timing analysis are performed (step 64) to judge whether the estimated clock skew meets the clock skew constraint (step 65). If it is determined that the clock skew constraint is met, the clock tree synthesis step is finished. On the contrary, if it is determined that the clock skew constraint is not met, the clock tree synthesis should be further fine-tuned (step 66). For example, at least one non-active wire delay module is inserted in the corresponding timing path or an active delay cell is replaced with the non-active wire delay module. Both of the above-mentioned methods can fine-tune the delay time. The above-mentioned non-active wire delay module is provided by a standard wire delay module library which collects definition of many non-active wire delay modules with various time delays for designer's selection (step 67).

Figure 7:
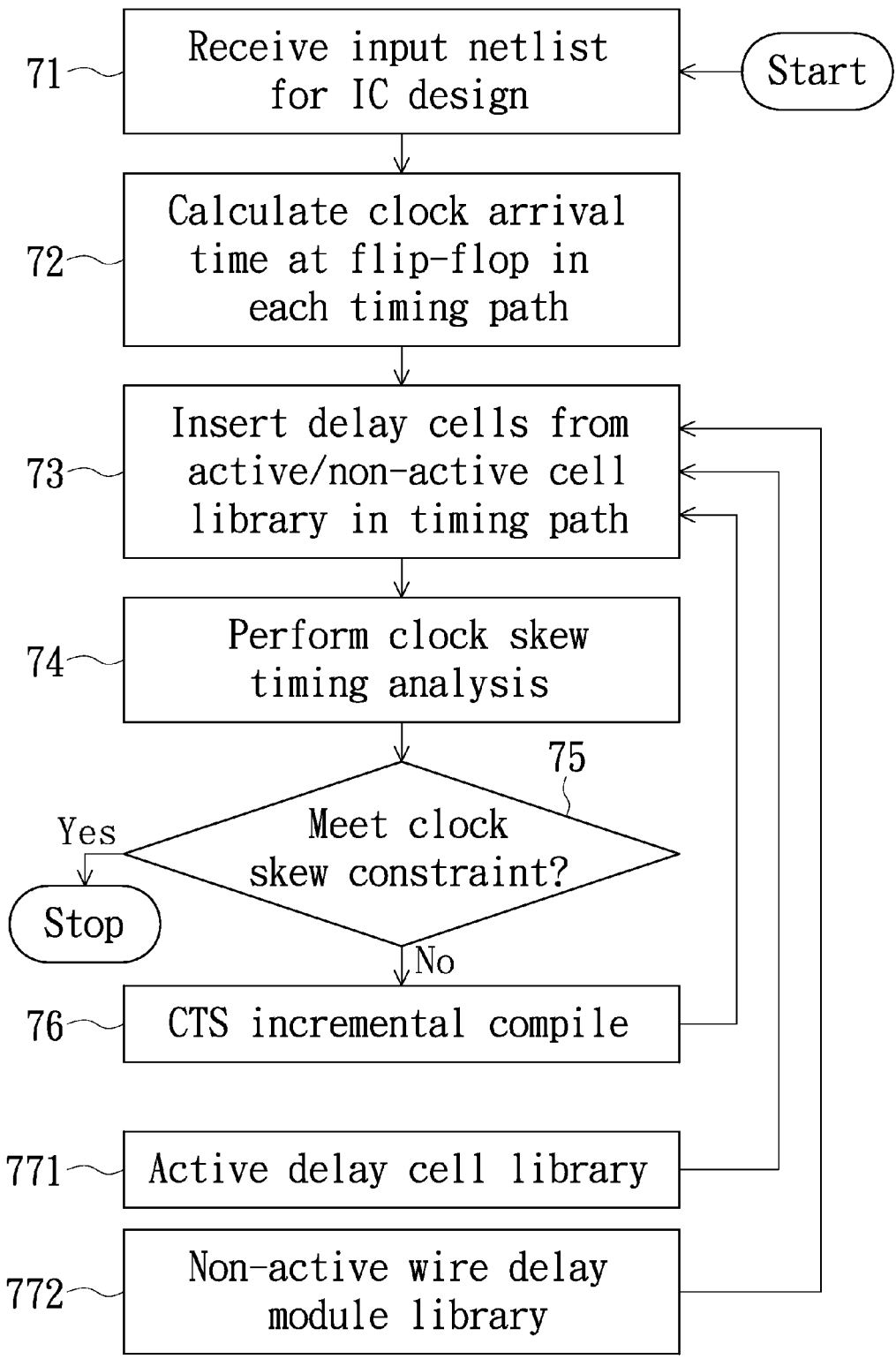
FIG. 7 is a flow chart illustrating a clock skew adjusting method for clock tree synthesis according to a fourth embodiment of the present invention.

Another flow chart shown in FIG. 7 illustrates a clock skew adjusting method for clock tree synthesis according to another embodiment of the present invention. At first, an input netlist for a specific IC design is received (step 71). Then, according to the input netlist, different clock arrival times for multiple flip-flops due to having different timing paths or clock path lengths are calculated (step 72). To reduce the difference in clock arrival time at the flip-flops, delay cells are inserted in corresponding timing paths (step 73). The delay cells include active delay cells or non-active wire delay modules. Then, RC extraction and timing analysis are performed (step 74) to judge whether the estimated clock skew meets the clock skew constraint (step 75). If it is determined that the clock skew constraint is met, the clock tree synthesis step is finished. On the contrary, if it is determined that the clock skew constraint is not met, an incremental compilation for the clock tree synthesis is performed (step 76) to focus on the areas of the design that do not meet the constraint and slightly change the combination of the delay cells and the delay times. Thus, the overall delay time is fine-tuned. The above-mentioned non-active wire delay module is provided by a standard cell library which collects definition of many non active wire delay modules with various time delays for designer's selection (step 772). Similarly, the above-mentioned active delay cell may be selected from a standard cell library which collects definition of active delay cells with various time delays (step 771).

Although the above-described embodiments are illustrated to adjust the clock skew between the flip-flops, the clock skew adjusting method and structure are applicable to other sequential logic units to reduce the clock skew.

For those having ordinary skill in the art, it is understood that all or part of the steps in the various embodiments described above can be executed by a program instructing relevant hardware or implemented by one or more sequences of computer-executable instructions. The corresponding program or instructions for causing one or more processing units to perform the methods may be stored in a computer-readable medium. The so-called medium can be, for example, a ROM/RAM, disk or optical disk, etc.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An clock skew adjusting structure comprising:
a substrate;
a wiring structure including a plurality of wiring layers and a plurality of via arrays, wherein each one of the wiring layers in shape of a ring, the via arrays are configured for different wiring layers to be electrically connected with each other;
a first active component formed on the substrate and configured for delivering a clock signal to the wiring structure; and
a second active component formed on the substrate and electrically connected to the first active component through the wiring structure thus forming a timing path, the second active component receiving the clock signal through the timing path,
wherein each one of the wiring layers cooperatively formed a three-dimensional structure, each one of the via array including a plurality of vias.

2. The clock skew adjusting structure as claimed in claim 1, wherein the first active component and the second active component are one of a clock source, a flip-flop and an active delay cell.

3. The clock skew adjusting structure as claimed in claim 1, wherein the wiring structure is a non-active wire delay module.

4. The clock skew adjusting structure as claimed in claim 1, wherein different wiring layers include wires with different widths.

* * * * *